United States Patent [19]

Bush

[11] Patent Number: 4,756,017
[45] Date of Patent: Jul. 5, 1988

[54] TELEPHONE TEST DEVICE

[75] Inventor: Gary K. Bush, Tustin, Calif.

[73] Assignee: Golden State Communications Service, Inc., Santa Ana, Calif.

[21] Appl. No.: 29,251

[22] Filed: Mar. 23, 1987

[51] Int. Cl.$^4$ .............................. H04B 3/46
[52] U.S. Cl. ........................... 379/23; 379/22; 379/26
[58] Field of Search ............. 379/23, 22, 26, 27, 379/29

[56] References Cited

U.S. PATENT DOCUMENTS

| | | | |
|---|---|---|---|
| 3,976,849 | 8/1976 | Champan | 179/175.25 |
| 4,323,738 | 4/1982 | Merrick | 179/175.1 R |
| 4,369,341 | 1/1983 | Ahuja | 179/175.2 R |
| 4,413,163 | 11/1983 | Basini | 179/175.3 R |
| 4,443,669 | 4/1984 | Kopetzky | 179/175.2 C |
| 4,513,176 | 4/1985 | Fostveit | 179/175.1 R |
| 4,544,807 | 10/1985 | Sers | 379/26 |
| 4,581,494 | 4/1986 | Pickens | 179/175.3 R |

Primary Examiner—Stafford D. Schreyer
Attorney, Agent, or Firm—Spensley Horn Jubas & Lubitz

[57] ABSTRACT

The device is inserted at the jack between the tip-ring signals of a telephone company's line and the customer's telephone lines and equipment to isolate the location of telephone problems. A first tri-color light emitting diode shows either "off" or "green" when a problem is detected, "red" if a telephone company line reversal exists, or "yellow" upon detection of a ring generator signal. When problems are detected, a switch is manually positioned to connect a second tri-color LED between the tip and ring signals while disconnecting the first tri-color LED and the telephone equipment. If the second tri-color LED is "off" then there is no dial tone; if it is "green" then the tip-ring signal lines are reversed; if it is "red" then the problem is within customer-owned telephone equipment. A battery test of the tri-color LED's is optionally incorporated. A variant test device connected at a RJ21 jack for testing ground start telephone trunk lines is also disclosed.

12 Claims, 3 Drawing Sheets

TELEPHONE TEST DEVICE

BACKGROUND OF THE INVENTION

1. Field of the Invention

This invention relates to telephone testing equipment.

2. Background of the Invention

Devices exist for testing telephone lines and equipment. Many of these devices require trained technicians for operation. However, a few exist which can be operated by persons who are not technically trained.

Impetus for the development of customer-operated telephone test equipment has resulted from recent deregulation of the United States telephone industry. In the past, telephone customers having problems with their telephone equipment received service exclusively from the telephone company regardless of where the problem existed. Now, however, a telephone company is responsible only for the servicing of telephone equipment and lines physically reaching a defined point within the customer's premises, which may be a modular plug jack typically designated as RJ11X, RJ14X or RJ21X. All remaining telephone wiring and connected equipment within the customer's premise are the service responsibility of the customer.

This division in responsibility for servicing of lines and equipment is reflected in the customer's bills, i.e., the phone company will not charge for repair services if the problem is in their office, outside plant, at the customer's service drop or protector. If the problem exists from the protector on into the customer's premises, the customer is charged for its repair. Accordingly, a need exists for a simple device which would permit a technically-unsophisticated customer to distinguish between problems occurring in his equipment and that of the phone company.

One device for locating a problem is disclosed in U.S. Pat. No. 4,581,494. In a normal position, the device selectively couples and uncouples a telephone company line to the customer's telephone lines and equipment, and, in a test position, to an audio amplifier connected to a speaker. The presence or absence of a dial tone in the test position indicates whether the problem resides within the telephone company's line, or within the customer's lines and equipment.

U.S. Pat. No. 3,976,849 discloses a device for testing telephone wiring connections and signals, and in particular, tip-ring direct current signals, and ground and lamp alternating current signals. Indications of test results are in the form of two light-emitting diode indicators which illuminate at varying intensity.

U.S. Pat. No. 4,513,176 discloses a simple device for determining the origin of phone problems which includes a multiple position switch normally connecting the telephone company's line to the customer's wiring and telephone equipment, and alternatively, to one or more test circuits. Each of the test circuits has a visual or audible indicator to indicate the presence, or absence, of a tested-for condition.

Other portable telephone test devices of varying sophistication exist. For example, U.S. Pat. Nos. 4,323,738; 4,369,341; 4,413,163; 4,443,669; and 4,575,588 are all concerned with the simplified testing of telephone line terminations. The devices shown in these patents include audio and visual indications of the results of such testing.

Many of the test circuits disclosed in these patents are complex and often provide visual and/or audible indications which go beyond the basic requirement of the telephone customer, which is simply to identify whether a problem experienced is due to a problem in a line under his control or that of the telephone company.

SUMMARY OF THE INVENTION

The present invention permits technically-unsophisticated phone customers to determine whether their phone problems originate within their equipment or lines or those of the telephone company ("telco") and is embodied in a test apparatus which is connected between the company's line, or "trunk", and the customer's lines and telephone equipment.

One embodiment of the present invention is particularly useful for testing a two-wire residential line. The embodiment includes two indicators which indicate the presence or absence of current flow in a set direction, and a switch. In a first position, the switch electrically connects the company's line to the customer's equipment through a first indicator, thereby providing an indication of the operability of both the company's line and the customer's equipment. In a second position, the switch connects the tip and ring signal wires of the company's line to each other through a second indicator in series with a load, thereby providing a test of the company's line.

A second embodiment of the present invention is particularly useful between a two-wire company controlled trunk line (used with PBX service) and a customer's telephone. It includes a switch and two indicators which indicate the presence or absence of current flow and current direction.

In a first position, the switch connects the trunk lines, tip and ring signal to the customer's equipment through the first indicator and connects the tip signal, taken at the point of the series junction of the first indicator and the customer's telephone equipment, through the second indicator to ground.

In a second position, the switch connects the two tip and ring signal wires of the trunk to each other through the first indicator in series with a load and disconnects the tip signal from the path to ground through the second indicator.

The second embodiment includes a ground start switch which can be momentarily positioned to ground the tip signal line, thereby actuating the ground start circuit of the telephone trunk line. Observation of the indicators at each position of the switch isolates the problem to the trunk lines or to the customer's lines and equipment.

The present invention is economically constructed, readily installed in a telephone circuit by plugged connection, reliable, and electrically compatible as to be left permanently in-line.

DESCRIPTION OF THE PREFERRED EMBODIMENTS

This invention locates problems experienced with telephone lines and equipment. The device may be used by technically-unsophisticated persons because it provides unambiguous visual indications during a simple, automatic test sequence. The present invention particularly isolates the location of dial tone failures. It also indicates the location of (i) failures of the ringing generator signal provided by the telephone company (Telco), (ii) polarity reversals between the tip and ring signal lines provided by the telephone company, and (iii) whether the line is busy or idle.

Figure 1:
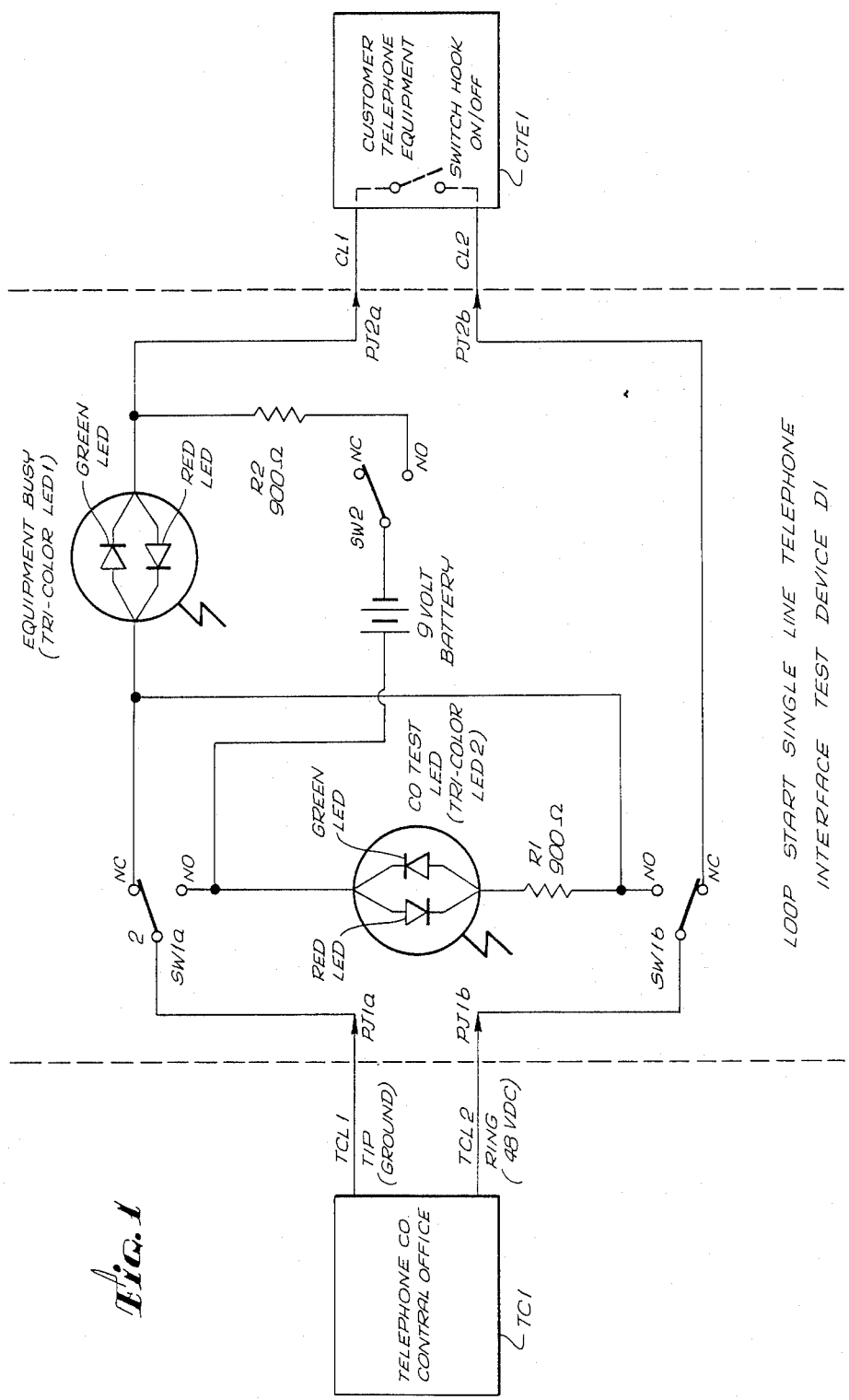
FIG. 1 is a schematic diagram of a first preferred embodiment of the present invention.

A schematic diagram of a first preferred embodiment of the present invention is shown in FIG. 1. The first embodiment is used with a loop start circuit telephone service, such as is commonly provided to residences and small businesses.

Figure 3:
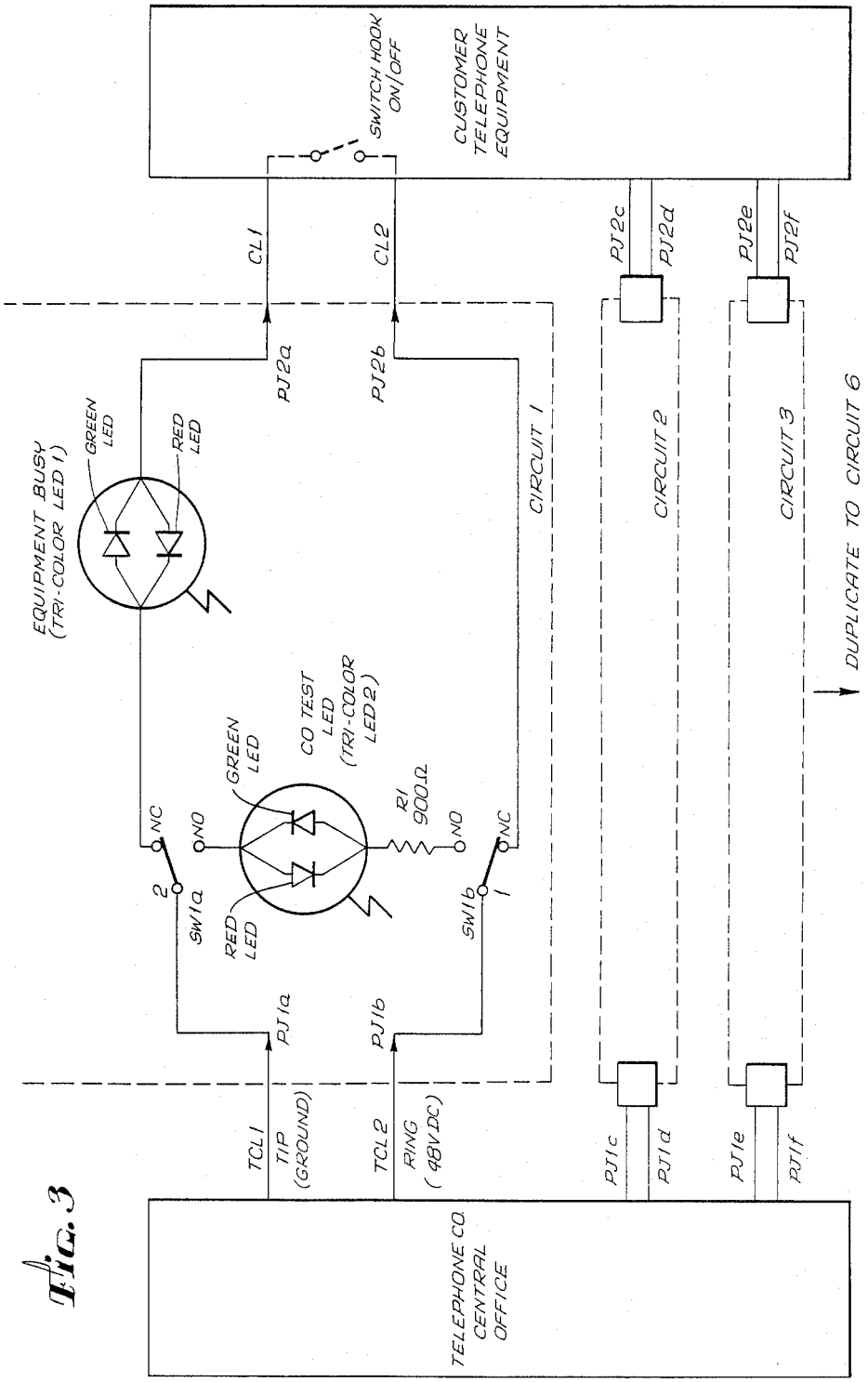
FIG. 3 is a schematic diagram of an alternative first preferred embodiment of the present invention.

FIG. 3 is a schematic of an alternative first embodiment of the present invention shown in place between the telephone company's line and a customer's medium-sized, multiple-line loop start 6-line telephone service.

The device D1 shown in FIG. 1 is connected between the telephone company's lines and equipment TC1 and the customer's lines and equipment CTE1. More particularly, the device D1 is situated betwen the telephone company tip and ring signal lines TCL1 and TCL2, respectively, and the customer-controlled tip and ring signal lines CL1 and CL2, respectively.

In modern phone services, a connection block, typically a modular plug jack, is the dividing point between the equipment and lines which are the responsibility of the telephone company and those which are the customer's. For normal, residential, loop start circuit telephone service, the division of responsibility occurs at an RJ11-type modular plug jack or protector. With respect to the device D1 shown in FIG. 1, RJ11-type plug-jack connections PJ1a and PJ1b are made to the tip signal line TCL1 and the ring signal line TCL2, respectively. RJ11 type plug jacks PJ2a and PJ2b connect customer lines CL1 and CL2 to customer's telephone equipment CTE1. The device D1 can be plugged permanently in-line to give ongoing telephone problem origin indications as discussed below.

The device D1 incorporates a first current flow indicator labelled "EQUIPMENT BUSY", and a second current flow indicator labelled "CO TEST" (Telco central office). These indicators may be simple current flow indicators, such as a light-emitting diode (LED).

Also incorporated is a single-throw, double-pole switch SW1a,b. In a first, normally closed (NC) position of the switch SW1, the tip and ring signal lines TCL1 and TCL2 are connected to the corresponding customer telephone lines CL1 and CL2. These lines are in turn connected to the customer telephone equipment CTE1. In a second, test position of switch SW1, the tip signal line TCL1 is routed through the CO TEST indicator and in series through a load resistor R1 to the ring signal line TCL2.

If both the EQUIPMENT BUSY and/or the CO TEST indicator light up, this indicates either a fault in (i) the customer's telephone equipment CTE1 and/or lines CL1 or CL2, or (ii) the telephone company's signals and/or lines TCL1 or TCL2. If an LED (not shown in FIG. 1) serving as the EQUIPMENT BUSY indicator is aligned in the same direction as the green LED within the tri-color LED 1 (see in FIG. 1), its illumination while the switch SW1 is in the (NC) position will indicate current flow through the customer's equipment CTE1 sufficient to cause a dial tone. A dial tone is generated by a 0 v.d.c., or ground, level upon the tip signal line TCL1 and an approximate 48 v.d.c. level upon the ring signal line TCL2.

Conversely, if the EQUIPMENT BUSY LED indicator does not light while the customer's equipment CTE1 is off-hook, a further test step is then taken. The switch SW1 is positioned to the normally open (NO) position. Depending on whether a second LED (not shown in FIG. 1), aligned in the same direction as the red LED within the CO TEST tri-color LED 2 shown in FIG. 1, lights or remains off, the respective presence or absence of the tip and ring signal voltages from the telephone company is indicated. By these steps, the equipment and line problems are localized, and the presence of a dial tone may be monitored.

The preferred EQUIPMENT BUSY and CO TEST indicators as shown in FIG. 1 indicate both the presence and direction of current flow. A suitable low-cost indicator for this function is a tri-color LED. Each tri-color LED is contained within a single package having two leads and containing two oppositely-aligned LEDs of different colors, for example, red and green. A tri-color LED will light either red or green depending on the direction (polarity) of direct current flow, or will appear to light yellow when alternating current is applied.

The preferred device D1 includes an EQUIPMENT BUSY tri-color LED 1 and a CO TEST tri-color LED 2. Observation of the indicators with switch SW1 in the closed condition (illustrated in FIG. 1), will be in accordance with the following Table 1, which is discussed below:

TABLE 1

| PROBLEM | EQUIP BUSY LED WITH SW 1 NC | | | |
|---|---|---|---|---|
| | OFF | GRN | RED | YEL |
| NO DIAL TONE | GO TO TEST | TELCO LINE 'OK-PHONE OFF HOOK OR PROBLEM IN CUST. EQUIPMENT | TELCO LINE REV'D - PROBLEM AT TELCO | INCOMING CALL-IF ANSWERING IMPOSSIBLE, PROBLEM AT TELCO |
| BUSY SIGNAL | (N/A) | LINE BUSY OR SHORT IN CUST. EQUIP-GO TO TEST | TELCO LINE REV'D AND POSSIBLE SHORT IN CUST. EQUIP.- GO TO TEST | INCOMING CALL-IF ANSWERING IMPOSSIBLE, PROBLEM AT TELCO |

Considering the circuit of the device D1 shown in FIG. 1, the CO TEST tri-color LED 2 will initially be off (with switches SW1 and SW2 in their normally closed position). If the EQUIPMENT BUSY tri-color LED 1 indicates green, which is the normal condition for current flow between the tip signal (ground) and the ring signal (48 volts d.c.), then lack of a dial tone at the customer's telephone equipment CTE1 indicates, in accordance with Table 1, that such equipment is either off-hook or is experiencing a problem. If the polarity of the telco's tip and signals are reversed, the EQUIPMENT BUSY tri-color LED 1 will indicate red, and the customer should notify the telco.

A yellow condition on the EQUIPMENT BUSY tri-color LED 1 indicates the presence of an alternating current ring signal, labeled in Table 1 as an INCOMING CALL. The appropriate response here is to attempt to answer the call. If the call cannot be answered and the ring signal does not cease, then the problem is in the telephone company's equipment.

If both the EQUIPMENT BUSY and CO TEST tri-color LED's 1 and 2 are off, as indicated in Table 1, the appropriate response is to set up a first test condition by positioning switch SW1 to the normally open (NO) position.

The possible observations upon positioning switch SW1 to the NO position are shown in the following Table 2, and discussed below.

TABLE 2

| CO TEST LED STATUS WITH SW1 NO | | | |
|---|---|---|---|
| OFF | GRN | RED | YEL |
| NO TELCO DIAL TONE - PROBLEM AT TELCO | TELCO LINE REV'D - PROBLEM AT TELCO | PROB. IN CUST. EQUIP | (N/A) |

Upon positioning the switch SW1 to the NO position, the tip signal is routed via line TCL1 through CO TEST tri-color LED 2 and resistor R1 (which is connected to ring signal line TCL2). If the CO TEST LED 2 does not provide any color indication, then there is no voltage between the tip and ring signal lines. Therefore, the telephone company equipment TC1 is not providing a dial tone and is malfunctioning.

If the CO TEST tri-color LED 2 shows green, then there is a line (polarity) reversal problem between the tip and ring signals, which is the responsibility of the telephone company.

If the CO TEST LED 2 shows red, the test indicates that the customer's lines or equipment are a source of the problem.

Optionally, a preferred embodiment of the apparatus of the present invention may provide for a test of the LED's.

The LED test involves positioning switch SW2 to the normally open (NO) position. It does not matter for this test whether switch SW1 is in the normally closed (NC) or the normally open (NO) position. This step illuminates both LEDs simultaneously to verify that they are operational, and should not be performed frequently or for very long in order to conserve battery life.

It is possible to experience problems with telephone service even if a dial tone is correctly provided to, and detected by, the customer's telephone. One such problem is a lack of the ring signal. The preferred embodiment D1 of the present invention provides for the detection of the ring signal when switch SW1 is in the NC position (as illustrated in FIG. 1). A ring signal is generated by dialing the customer's telephone equipment using another, operative telephone. The possible indications by performing this test are shown in the following Table 3, which is discussed below.

If the EQUIPMENT BUSY LED 1 shows off, then the telephone company's equipment is failing to provide the ring signal.

If the EQUIPMENT BUSY LED 1 shows yellow, then a ring signal has been provided by the telephone company's equipment TC1 and if the customer's telephone equipment CTE1 still does not ring, then there is a problem within the customer's equipment.

As will be evident from the foregoing, use of the device D1 of the present invention is simple and straightforward. The device is plugged in line between the customer's telephone equipment and the Telco equipment. By following the test procedure previously outlined, the customer will be called upon to listen to a dial tone, busy signal, or ring, throw the switch, and observe the results on the indicators. By so doing, the customer will shortly arrive at a determination of whether the problem lies within his own equipment or that of the phone company.

Figure 2:
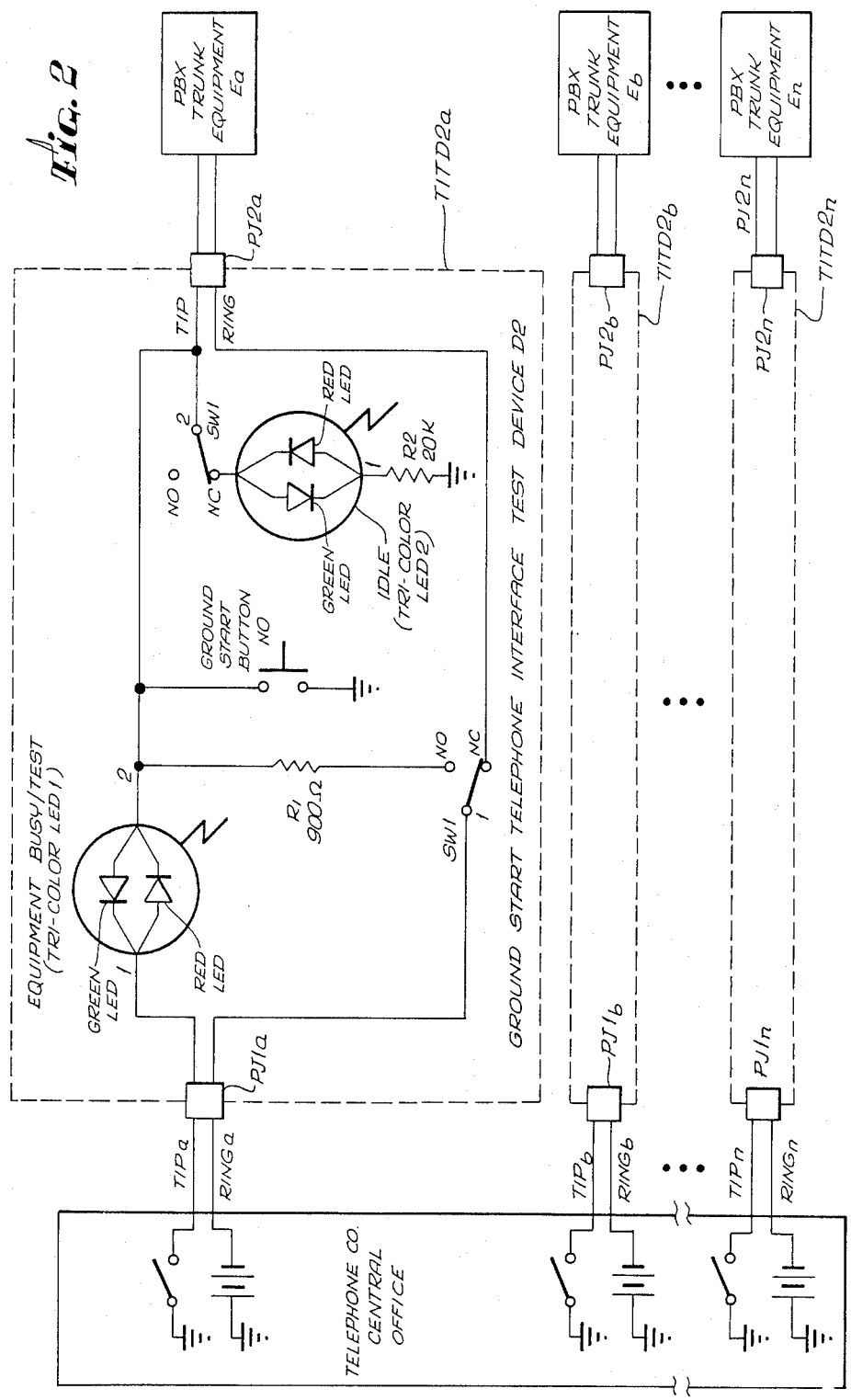
FIG. 2 is a schematic diagram of a second preferred embodiment of the present invention.

A second embodiment of the present invention is illustrated schematically in FIG. 2 as D2. This embodiment is particularly useful for testing ground start telephone circuits, such as are common with private branch exchange (PBX) telephone service.

A PBX service typically includes a number of trunk lines, each consisting of a tip signal and a ring signal, which are connected to a like number of PBX trunk equipment, e.g., PBX trunk circuit packs. FIG. 2 shows "n" trunk lines, each consisting of TIP and RING signal lines connected to jacks PJ1a–n which are routed to "n" PBX trunk equipments Ea through En. Selectively within each trunk line, and preferably within all trunk lines, a device D2 is inserted. The device D2 is connected at RJ21X Blocks via, e.g., 25-pin Amphenol® connectors, namely, PJ1a through PJ1n, and PJ2a through PJ2n.

The schematic diagram for the device D2a is shown in FIG. 2, and it may be understood that the identical circuit may be contained within devices D2b through D2n. The device D2 employs two indicators which preferably indicate the presence and direction of current flow. These indicators are called EQUIPMENT BUSY/TEST tri-color LED 1 and IDLE tri-color LED 2. It should be understood that the basic function of the circuit of the present invention could be realized if each of the EQUIPMENT BUSY/TEST and IDLE indicators simply indicated the presence or absence, and not the direction, of current flow in a set direction. Such a rudimentary indicator would be a simple LED, as opposed to the preferred tri-color LED's illustrated.

The IDLE LED is always on when the device is incorporated into the circuit and indicates green. The purpose of this indicator is to give the customer a visual IDLE indication. If no indication is received, it may mean the customer's equipment is defective or simply unplugged or disconnected at a cross-connect point.

In the normal, neutral condition of the in-line device D2, the single-throw, dual-pole switch SW1 is in the normally closed (NC) position as illustrated in FIG. 2.

TABLE 3

| PROBLEM | EQUIP BUSY LED WITH SW1 NC | | | |
|---|---|---|---|---|
| | OFF | GRN | RED | YEL |
| KNOWN INCOMING CALL BUT NO RING | NO TELCO RING GENERATOR PRESENT-TELCO PROBLEM | LINE BUSY OR POSSIBLE SHORT IN CUSTOMER EQUIP-GO TEST | LINE BUSY OR POSSIBLE SHORT IN CUSTOMERS EQUIP AND TELCO LINE REV'D - GO TO TEST | TELCO RING GENERATES PRESENT - CUSTOMER EQUIP PROBLEM |

In this position, the telephone company's ring signal line is directly connected through the device to the customer's ring signal line. Also, the telephone company's tip signal line is connected through the EQUIPMENT BUSY/TEST tri-color LED 1 to the tip signal line of the customer's PBX trunk equipment. The junction of the EQUIPMENT BUSY/TEST tri-color LED 1 and the PBX trunk equipment is further connected through switch SW1 in the NC position through the IDLE tri-color LED 2 and through resistor R2 to ground. The status observable at both indicators in this initial condition is interpreted in accordance with the following Table 4, which is discussed below:

TABLE 4

| EQUIP BUSY/TEST LED STATUS WITH SW1 NC | | | |
|---|---|---|---|
| OFF | GRN | RED | YEL |
| OK TO TEST | LINE REV.- GO TO TEST | LINE IN USE - WAIT BEFORE TEST | INCOMING CALL - WAIT BEFORE TEST |

When the EQUIPMENT BUSY/TEST tri-color LED 1 is off, then a test sequence may be performed. Testing might be desired because of telephone problems, or simply to validate the telephone service. Problems may be manifested by failure to obtain a dial tone upon one or more of the PBX trunk equipments Ea through En, or by failure to obtain a ring with incoming calls. As may be observed in Table 4, the yellow condition of the EQUIPMENT BUSY/TEST tri-color LED 1 indicates that an incoming call is in progress (which may be verified by listening to the bell ringer of the PBX trunk equipment).

A particular trunk may be tested by initiating an incoming call to that trunk. Such a call should cause the BUSY/TEST LED to flash from steady red to flashing yellow. When the call is answered, the LED should cease flashing yellow and indicate a steady red. If no one answers when the phone is picked up, and the trunk tests OK when SW1 is thrown to the NO position and the ground start button depressed, a yellow BUSY/TEST LED indicates probable customer equipment problems.

If a "ringing" (yellow LED) indication is present and if no one answers, the SW1 switch should then be moved to the NO position and the ground start button depressed. If the BUSY/TEST LED does not indicate red, a problem exists within the Telco equipment.

The red condition of the EQUIPMENT BUSY/TEST LED 1 indicates that the line is in use, and the indicator should cease to indicate this condition when the PBX trunk equipment is placed on hook. If it fails to do so, there is a problem with the PBX trunk equipment.

The green condition of the EQUIPMENT BUSY/TEST tri-color LED 1 preliminarily indicates a line reversal between the tip and ring signals provided by the telephone company. Regardless of what color is indicated by the EQUIPMENT BUSY tri-color LED 1, a manual test sequence may be performed as discussed below.

The device D2 is used to test the PBX trunk line and equipment by placing switch SW1 in the normally open (NO) position. When ground start button GSB, which is normally open (NO), is momentarily depressed, it connects the tip signal line to ground. In response to the ground start signal, the telephone company should transmit a dial tone across the tip and ring signal lines. With SW1 in the NO position, the customer's equipment is taken off line. If depression of the ground start button results in a red BUSY/TEST LED, this indicates that Telco's dial tone is present and in the proper polarity. Conversely, if the BUSY/TEST LED does not show red, this is an indication that no dial tone is present from the telephone company, a Telco problem. A green BUSY/TEST LED indicates the line is reversed. In either case, the telephone company should be notified, as the problem lies within their equipment (see Table 5).

TABLE 5

| EQUIP BUSY/TEST LED STATUS WITH SW1 NO AND GSB CLOSED | | | |
|---|---|---|---|
| OFF | GRN | RED | YEL |
| OPEN TELCO TRUNK - TELCO PROBLEM | TELCO TRUNK REV'D - TELCO PROBLEM | TELCO DIAL TONE PRESENT AND IN CORRECT POLARITY - PROBLEM, IF ANY, IN CUSTOMER EQUIP | INCOMING CALL |

It will be noted that the IDLE tri-color LED 2 is off during those tests because is electrically disconnected, i.e., SW1 is in the NO position.

The EQUIPMENT BUSY/TEST tri-color LED 1 also serves to indicate the nature of the failure to obtain a dial tone. The tip signal line is routed through the EQUIPMENT BUSY/TEST tri-color LED 1 in series with resistance R1 to be connected by SW 1 to the ring signal line. A total failure of the EQUIPMENT BUSY/TEST tri-color LED 1 to light indicates that either no ring signal or no tip signal is being provided by the telephone company. This fault is indicated in Table 5 as "OPEN TELCO TRUNK". If the EQUIPMENT BUSY/TEST tri-color LED 1 is green, then the tip and ring signals are reversed. This fault is indicated in Table 5 as "TELCO TRUNK REV." Finally, if the EQUIPMENT BUSY/TEST tri-color LED 1 indicates red, then any problem must exist within the PBX trunk equipment.

In accordance with (i) the two preferred embodiments of the present invention, (ii) the possible use of simple (LED) current indicators but the preferred use of current direction (tri-color LED) indicators, and (iii) the optional addition of further circuitry such as that providing a LED indicator test within the first embodiment, it may be understood that the present invention may assume diverse forms and variations in construction. Consequently, the scope of the present invention should be assessed only by the following claims, and not solely in accordance with those particular circuit embodiments within which the present invention has been taught, which should be taken as exemplary in nature.

I claim:

1. A test apparatus for use between a two wire telephone-company-controlled line and a customer's telephone equipment to indicate the operability of the line and the equipment, comprising:
   a first indicator of current flow;
   a second indicator of current flow; and
   a first switch having
      a first position electrically connecting the telephone-company-controlled line to the customer's equipment through the first indicator, and a second position electrically connecting the two wires of the telephone-company controlled line to each other through the indicator, wherein the operability of the first and second indicator is testable, the test apparatus further comprising:
- a voltage source; and
- a second switch having
  - a first position presenting an open circuit, and
  - a second position electrically connecting the voltage source, the first indicator and the second indicator in series in a closed loop.

2. A telephone line and telephone equipment test apparatus, comprising:
- a first plug jack electrially connected to d.c. telephone company lines for receiving a d.c. tip-ring voltage therefrom;
- a second plug jack electrically connected to d.c. telephone equipment lines for transmitting a d.c. tip-ring voltage thereto;
  - a first indicator of current flow and direction of current flow;
  - a second indicator of current low and direction of current flow; and
  - a first switch having
- a first position electrically connecting the first plug jack through the first indicator to the second plug jack while electrically disconnecting the second indicator, and
- a second position electrially connecting the d.c. tip-ring voltage recieved by the first plug jack across the second indicator while electrically disconnecting the first indicator and the second plug jack;
- A voltage source;
- a second switch, independent of the first switch, having
  - a first position presenting an open circuit, and
  - a second position connecting the voltage source and the first indicator and the second indicator in series in a closed loop.

3. A self-contained, trouble source locator for telephone service, comprising;
- a first indicator of current flow;
- a second indicator of current flow;
- a single-throw, double-pole switch connected on one side to a telephone company wiring junction at the customer's premises,
- the switch having a first switch position connecting the telephone company wiring junction through the first indicator, then through the customer's wiring to his telephone instruments, the switch normally being maintained in its first switch position to connect the telephone instruments to the telephone company wiring junction such that the first indicator indicates current flow through the telephone instruments,
- the switch having a second switch position operably connecting to the second indicator for indicating whether or not a telephone company's bell ringing voltage is being received at the wiring junction, movement of the switch out of its first position and into its second position being operable to disconnect the customer's wiring and telephone instruments from the telephone company wiring junction and to connect the latter to the second indicator, the second indicator being actuated upon receipt of the telephone company's bell ringing voltage at the wiring junction and otherwise inactive;
- a voltage source; and
- a single-pole, single-throw switch having
  - a first position presenting an open circuit, and
  - a second position electrically connecting the voltage source and the first indicator and the second indicator in series in a closed loop.

4. A telephone line tester for use between a telephone-company-controlled line having first and second electrically conductive paths, and a telephone subscriber equipment having first and second electrically conductive paths, to indicate the operability of the telephone-company-controlled line and the equipment, comprising:
- a first indicator of current flow and direction;
- a second indicator of current flow and direction;
- a first switch having
  - a first position connecting the company line first path through the first indicator to the subscriber equipment first path, and also connecting the company line second path to the subscriber equipment second path and
  - a second position connecting the company line first path through the second indicator to the company line second path, and also connecting the company line second path through the first indicator to the subscriber equipment first path;
- a voltage source having a first and second terminal; and
- a second switch which,
  - in a first position presents an open circuit, and
  - in a second position connects the voltage source and the first indicator and the second indicator in series in a closed loop.

5. A method for testing the operability of (i) the tip and ring signals of a telephone-company-controlled telephone line, (ii) a subscriber-controlled telephone equipment connected to the line and (iii) the operability of the method for testing the operability of (i) and (ii), comprising the steps of:
- observing in a first indicator of current flow and direction, the direction of current flow on the TIP signal line between the company-controlled line and the subscriber equipment and determining whether the telephone equipment shows (i) off-hook or on-hook with failure, or (ii) that it is available to conduct testing; and
- wherein it is determined that the telephone equipment has no dial tone and is available to conduct testing, then further;
- electrically disconnecting, in a switch, the first indicator and the telephone equipment from the company controlled line;
- electrically connecting, in a switch, the tip signal line through a second indicator of current flow and direction in series with a load impedance to the ring signal line; and
- observing in the second indicator a direction of current flow and thereby determining whether the company-controlled line or the customer-controlled equipment is inoperative; and
- for testing the operability of the first and second indicators, the steps of:
- electrically connecting, in a switch, the first indicator in series with the second indicator and a voltage source; and
- observing, in the first and second indicators whether current is flowing therein, thereby determining that each of the first and second indicators is operated.

6. A test apparatus for use between a two-wire telephone trunk line and a subscriber's telephone equipment to test the operability of the line and the equipment, the apparatus comprising:
a first indicator of current flow;
a second indicator of current flow; and
a first switch which,
in a first position, electrically connects the two wires of the trunk line in series through the first indicator and the telephone equipment to each other, and also electrically connects a TIP signal at the point of the series junction of the first indicator and the telephone equipment through the second indicator to ground, and
in a second position, electrically connects the two wires of the trunk line in series through the first indicator and a load to each other, and also disconnects both the TIP signal wire from the second indicator and the telephone equipment from the first indicator.

7. The test apparatus of claim 6, wherein:
the first indicator further indicates the direction of current flow therein; and
the second indicator further indicates the direction of current flow therein.

8. The test apparatus of claim 6, further comprising:
a second switch which,
in a first position, presents an open circuit, and
in a second position, electrically connects the TIP signal at the point of the series junction of the first indicator and the telephone equipment to ground.

9. The test apparatus of claim 8, wherein each of the first and second switches are manually actuatable.

10. A method of testing the operability of (i) the tip and ring signals of a telephone trunk and (ii) a subscriber telephone equipment normally connected to the trunk, the method comprising:
first observing, in a first indicator of current flow and direction, the direction of current flow on the TIP signal line between the telephone trunk and the telephone equipment, and determining thereby if the telephone equipment is busy;
second observing, in a second indicator of current flow and direction, the presence and direction of current flow between the tip signal line electrically connected at the point of the telephone equipment and ground, and determining thereby if the telephone equipment is idle; and
if the telephone equipment has no dial tone and is not busy and is idle, then
electrically disconnecting, in a switch, the second indicator and the telephone equipment from the telephone trunk;
momentarily electrically connecting, in a switch, the trunk tip signal line to ground through the first indicator; and concurrently,
electrically connecting, in a switch, the trunk tip signal line through the first indicator and a load impedance to the trunk ring signal line; and thereafter,
third observing in the first indicator a direction of current flow, and determining thereby whether the telephone trunk or the telephone equipment is inoperative.

11. The method of claim 10, wherein the steps of electrically disconnecting the second indicator and electrically connecting the trunk tip signal are accomplished by actuating a single switch.

12. A test apparatus for use between (i) tip and ring telephone subscriber signal lines and (ii) telephone equipment, the apparatus comprising:
means for indicating the direction of current flow; and
switch means for, in a first position, switching the current-direction-indicating means in-line between the tip telephone subcriber single line and the telephone equipment while also switching the ring telephone subscriber signal line to the telephone equipment, and for, in a second position, switching the current-direction-indicating means in-line between the tip telephone subscriber signal line and the ring telephone subscriber signal line while also disconnecting the telephone equipment.

* * * * *